United States Patent
Hisatomi

(10) Patent No.: US 6,718,185 B1
(45) Date of Patent: Apr. 6, 2004

(54) RADIO TELEPHONE SYSTEM AND METHOD OF DISPLAYING SUBSCRIBER DATA ICONS

(75) Inventor: Tetsuya Hisatomi, Tokyo (JP)

(73) Assignee: NEC Corporation, Tokyo (JP)

(*) Notice: Subject to any disclaimer, the term of this patent is extended or adjusted under 35 U.S.C. 154(b) by 576 days.

(21) Appl. No.: 09/707,997

(22) Filed: Nov. 8, 2000

(30) Foreign Application Priority Data

Nov. 8, 1999 (JP) .......................................... 11-316903

(51) Int. Cl.[7] ................................................ H04B 1/38
(52) U.S. Cl. ..................... 455/566; 455/554.1; 455/555
(58) Field of Search .............................. 455/566, 554.1, 455/555, 418–420, 550.1, 416, 417

(56) References Cited

U.S. PATENT DOCUMENTS

| | | | |
|---|---|---|---|
| 5,794,142 A | * | 8/1998 | Vanttila et al. ............. 455/419 |
| 5,887,255 A | * | 3/1999 | Jackson et al. .......... 455/426.1 |
| 6,084,951 A | * | 7/2000 | Smith et al. ............. 379/93.17 |

FOREIGN PATENT DOCUMENTS

| | | |
|---|---|---|
| JP | 6-284206 | 10/1994 |
| JP | 11-17789 | 1/1999 |
| JP | 11-68823 | 3/1999 |

OTHER PUBLICATIONS

"J–NO1 Manual of Procedures; Basic Operations Edition"; Original Publication; Tokyo Digital Phone Co., Ltd.; Kansai Digital Phone Co., Ltd.; Tokai Digital Phone Co., Ltd.; Mar. 1999; Edition 1; pp. 4 and 140.

* cited by examiner

Primary Examiner—Quochien B. Vuong
(74) Attorney, Agent, or Firm—Young & Thompson

(57) ABSTRACT

A method of displaying subscriber data on a screen of a radio telephone in a radio telephone system is provided, which eliminates the necessity to access the center or control section of the system to confirm the status of its additional functions and which improves the convenience and operability of the functions. This method comprises the steps of (a) providing an exchange device for connecting/disconnecting telephone lines; (b) providing a storage device for storing a subscriber database; the subscriber database containing subscriber data of the system and status data about status of the additional functions; (c) providing a radio telephone connectable to the exchange device by radio; the telephone having a screen for displaying specific icons corresponding to the status data; (d) sending the telephone an icon signal corresponding to a piece of the status data that has been changed in the database; (e) receiving the icon signal thus sent by the telephone; and (f) displaying a specific icon corresponding to the icon signal thus received on the screen of the telephone.

18 Claims, 6 Drawing Sheets

RADIO TELEPHONE SYSTEM AND METHOD OF DISPLAYING SUBSCRIBER DATA ICONS

BACKGROUND OF THE INVENTION

1. Field of the Invention

The present invention relates to a radio telephone technique and more particularly, to a radio telephone system equipped with additional functions such as voice mail and absent call transfer, and a method of displaying specific data or information about the additional functions on the screen of a radio telephone with icons in a radio telephone system.

2. Description of the Related Art

Radio telephones have ever been extensively used practically. This is because radio telephones are mobile and capable of speech communication from a remote place. In recent years, there has been the growing need to provide radio telephones with specific convenient functions similar to the additional functions of so-called multifunction telephones, such as voice mail and absent call transfer.

To indicate the setting or status of the additional functions, typical multifunction telephones have indication lamps or lights formed by Light-Emitting Diodes (LEDs) The indication lamps are turned on or off according to the present status of the additional functions. The users of multifunction telephones are able to promptly know the present setting or status by looking at the corresponding lamps being turned on or off.

To meet the above-described need of providing specific convenient functions for radio telephones, some additional functions have already been installed to radio telephones. This necessitates some contrivance for indicating the present setting status of the additional functions thus installed to the users. As a result, formerly, some techniques to display specific icons on the small screen of radio telephones corresponding to the built-in functions have been developed for this purpose These prior-art techniques facilitate the users' selection of these functions and improve operability of radio telephones.

With the above-described prior-art techniques to display specific icons on the small screen of radio telephones, there are some problems explained as follows.

First, from the viewpoint of necessary compactness and power consumption reduction of radio telephones, a required number of indication lamps for displaying the status of the additional functions are unable to be installed on the compact body of radio telephones.

Second, the user may be unable to know or confirm the present setting of the additional functions even if the user selects some of the icons displayed on the small screen of radio telephones. For example, the user cannot know whether or not voice mail messages have been forwarded to his or her mail box at a glance into the screen. Also, the user cannot confirm promptly whether or not the absent call transfer function has been activated (i.e. the present setting of the absent call transfer function) from the screen.

Thus, to confirm the present setting of the additional functions, the user needs to access the center (or, the control section) of the radio telephone system.

Typically, the above-described radio telephone system is provided in an organization such as a corporation and thus, the center or control section includes a computerized Private Branch exchange (PBX). In this case, the PBX serves to provide the additional functions to the users, where the users are members of the organization.

However, the above-described radio telephone system may be realized with the use of public telephone networks. In this case, an exchange or switch device installed in the public telephone networks provides the additional functions to the users, where the users are not limited to the members of an organization.

An example of the related prior-art techniques to the invention is disclosed in the Japanese Non-Examined Patent Publication No. 11-17789 published in January 1999. In this technique, an icon table, a function table, and a setting menu table are stored in the memory of a mobile telephone. In the menu setting mode, specific icons are registered so as to correspond to the additional functions in the setting menu table according to the instruction applied from the input section by the user. In the function execution mode, the icons registered in the setting menu table are displayed on the screen of the telephone and then, the user selects or sets a desired function or functions by selecting one or more of the icons displayed on the screen. Thus, the correspondence between the icons and the additional functions can be optionally changed according to the user's intention.

Another example of the related prior-art techniques to the invention is disclosed in the Japanese Non-Examined Patent Publication No. 11-68823 published in March 1999. This technique relates to a communications system comprising mobile member terminals and a common server communicable to the member terminals through networks. If a communication channel is formed between the server and one of the terminals, the server sends specific homepage data to the terminal thus connected. The homepage data contains icon data corresponding to the information services the server can provide and therefore, the service-selection icons are displayed on the Screen of the terminal. If the user of the terminal selects one of the icons, a corresponding one of the information services to the selected icon is executed or activated.

With the prior-art techniques disclosed in the Japanese Non-Examined Patent Publication Nos. 11-17789 and 11-68823, it is clear that the above-described two problems are unable to be solved. As a result, there is the need to cancel the necessity of accessing the center or control section of the radio telephone system.

SUMMARY OF THE INVENTION

Accordingly, an object of the present invention is to provide a radio telephone system and a method of displaying subscriber data on the screen of a radio telephone that eliminates the necessity to access the center or control section of a radio telephone system in order to confirm the setting or status of installed additional functions.

Another object of the present invention is to provide a radio telephone system and a method of displaying subscriber data on the screen of a radio telephone that improve the convenience and operability of installed additional functions.

Still another object of the present invention is to provide a radio telephone system and a method of displaying subscriber data on the screen of a radio telephone that solve the problem or problems caused by the fact that the setting or status in the center or control section does not accord with the data displayed on the screen.

A further object of the present invention is to provide a radio telephone system and a method of displaying subscriber data on the screen of a radio telephone that provide equivalent services to multifunction telephones.

The above objects together with others not specifically mentioned will become clear to those skilled in the art from the following description.

According to a first aspect of the present invention, a radio telephone system having additional functions is provided. This system comprises:
(a) an exchange device for connecting/disconnecting telephone lines;
(b) a storage device for storing a subscriber database;
the subscriber database containing subscriber data of the system and status data about status of the additional functions; and
(c) a radio telephone connectable to the exchange device by radio;
the telephone having a screen for displaying specific icons corresponding to the status data;
wherein when a piece of the status data in the subscriber data has been changed, an icon signal corresponding to the piece of status data thus changed is sent to the telephone;
and wherein the telephone receives the icon signal thus sent and displays a specific icon corresponding to the icon signal on the screen.

With the radio telephone system according to the first aspect of the present invention, a storage device is provided for storing a subscriber database, where the subscriber database contains subscriber data of the system and status data about the status of the additional functions. A radio telephone, which is connectable to the exchange device by radio, has a screen for displaying specific icons corresponding to the status data.

When a piece of the status data stored in the subscriber database has been changed, an icon signal corresponding to the piece of status data thus changed is sent to the telephone. The telephone receives the icon signal thus sent and then, displays a specific icon corresponding to the icon signal on the screen.

As a result, the user of the radio telephone is unnecessary to access the center or control section of the radio telephone system in order to confirm the setting or status of the installed additional functions. This means that the convenience and operability of the installed additional functions is improved.

Also, since the status of the installed additional functions in the center or control section always accords with the data displayed on the screen of the radio telephone, the problem or problems caused by the disaccord between the status in the center or control section and the data displayed on the screen can be solved. Thus, equivalent services to multifunction telephones can be provided.

In a preferred embodiment of the system according to the first aspect, the icon signal is sent to the radio telephone along with a disconnection signal or a channel release signal sent from the exchange device.

In another preferred embodiment of the system according to the first aspect, the icon signal is inserted into a character data set that is sent to the radio telephone. The character data set contains specific characters to be displayed on the screen of the radio telephone.

In still another preferred embodiment of the system according to the first aspect, the icon signal contains a start code and instruction codes subsequent to the start code. The telephone recognizes start of the instruction codes by the start code while the telephone operates according to the instruction codes to thereby display the icon on the screen of the telephone.

In a further preferred embodiment of the system according to the first aspect, a first one of the instruction codes is used for designating an icon type while a second one of the instruction codes is used for designating whether or not the icon thus designated is displayed on the screen of the telephone.

It is preferred that the icon displayed on the screen of the telephone has a shape causing a user of the telephone to have an image about the piece of status data thus changed.

According to a second aspect of the present invention, a method of displaying subscriber data on a screen of a radio telephone in a radio telephone system having additional functions; the method comprising the steps of:
(a) providing an exchange device for connecting/disconnecting telephone lines;
(b) providing a storage device for storing a subscriber database;
the subscriber database containing subscriber data of the system and status data about status of the additional functions;
(c) providing a radio telephone connectable to the exchange device by radio;
the telephone having a screen for displaying specific icons corresponding to the status data;
(d) sending the telephone an icon signal corresponding to a piece of the status data that has been changed in the database;
(e) receiving the icon signal thus sent by the telephone; and
(f) displaying a specific icon corresponding to the icon signal thus received on the screen of the telephone.

With the method according to the second aspect of the present invention, because of substantially the same reason as the system according to the first aspect, the same advantages as those in the system according to the first aspect are given.

In a preferred embodiment of the method according to the second aspect, a step (g) of sending a call signal to the radio telephone and a step (h) of sending a disconnection signal to the telephone are additionally provided. The step (g) is performed prior to the step (d) of sending the telephone the icon signal. The step (h) is performed after the step (g) if the telephone receives the call signal. The icon signal is sent to the telephone along with the disconnection signal.

In another preferred embodiment of the method according to the second aspect, a step (i) of sending a disconnection signal from the radio telephone to the exchange device, a step (j) of retrieving the database to find existence or absence of change of the status data relating to the telephone, and step (k) of sending a disconnection signal to the telephone according to a retrieval result in the step (j) are additionally provided. The step (i) is performed prior to the step (d) of sending the telephone the icon signal. The icon signal is sent to the telephone along with the disconnection signal in the step (k).

In still another preferred embodiment of the method according to the second aspect, a step (l) of retrieving the database to find existence or absence of change of the status data relating to the telephone and a step (m) of sending a disconnection signal to the radio telephone according to a retrieval result in the step (l) are additionally provided. The step (l) is performed prior to the step (d) of sending the telephone the icon signal. The icon signal is sent to the telephone along with the disconnection signal in the step (m).

In a further preferred embodiment of the method according to the second aspect, the icon signal is sent to the radio telephone along with a disconnection signal or a channel release signal sent from the exchange device.

In a still further preferred embodiment of the method according to the second aspect, the icon signal is inserted into a character data set that is sent to the radio telephone.

The character data set contains specific characters to be displayed on the screen of the radio telephone. In this case, it is preferred that the icon signal contains a start code and instruction codes subsequent to the start code and that the telephone recognizes start of the instruction codes by the start code while the telephone operates according to the instruction codes to thereby display the icon on the screen of the telephone. Preferably, a first one of the instruction codes is used for designating an icon type while a second one of the instruction codes is used for designating whether or not the icon thus designated is displayed on the screen of the telephone.

In a still further preferred embodiment of the method according to the second aspect, the icon signal contains code sets inserted into a character data set that is sent to the radio telephone, the code sets being located at different position in the character data set. The character data set contains specific characters to be displayed on the screen of the radio telephone. In this case, it is preferred that each of the code sets contains a start code and instruction codes subsequent to the start code and that the telephone recognizes start of the instruction codes by the start code in each of the code sets while the telephone operates according to the instruction codes in the same code set to thereby display the icon on the screen of the telephone. Preferably, a first one of the instruction codes in each of the code sets is used for designating an icon type while a second one of the instruction codes in the same code set is used for designating whether or not the icon thus designated is displayed on the screen of the telephone.

In a still further preferred embodiment of the method according to the second aspect, a highest priority is assigned to a last one of the code sets in the step (f) of displaying the specific icon on the screen of the telephone. In this case, it is preferred that one of the instruction codes in a last one of the code sets is used for designating an icon type. Alternately, it is preferred that one of the instruction codes in a last one of the code sets is used for designating whether or not the icon thus designated is displayed on the screen of the telephone.

BRIEF DESCRIPTION OF THE DRAWINGS

In order that the present invention may be readily carried into effect, it will now be described with reference to the accompanying drawings.

FIG. 5 is a schematic illustration showing the operation of the system according to the embodiment of the invention, in which the speech communication is stopped by the person the user of the radio telephone has spoken to.

DETAILED DESCRIPTION OF THE PREFERRED EMBODIMENTS

Figure 1:
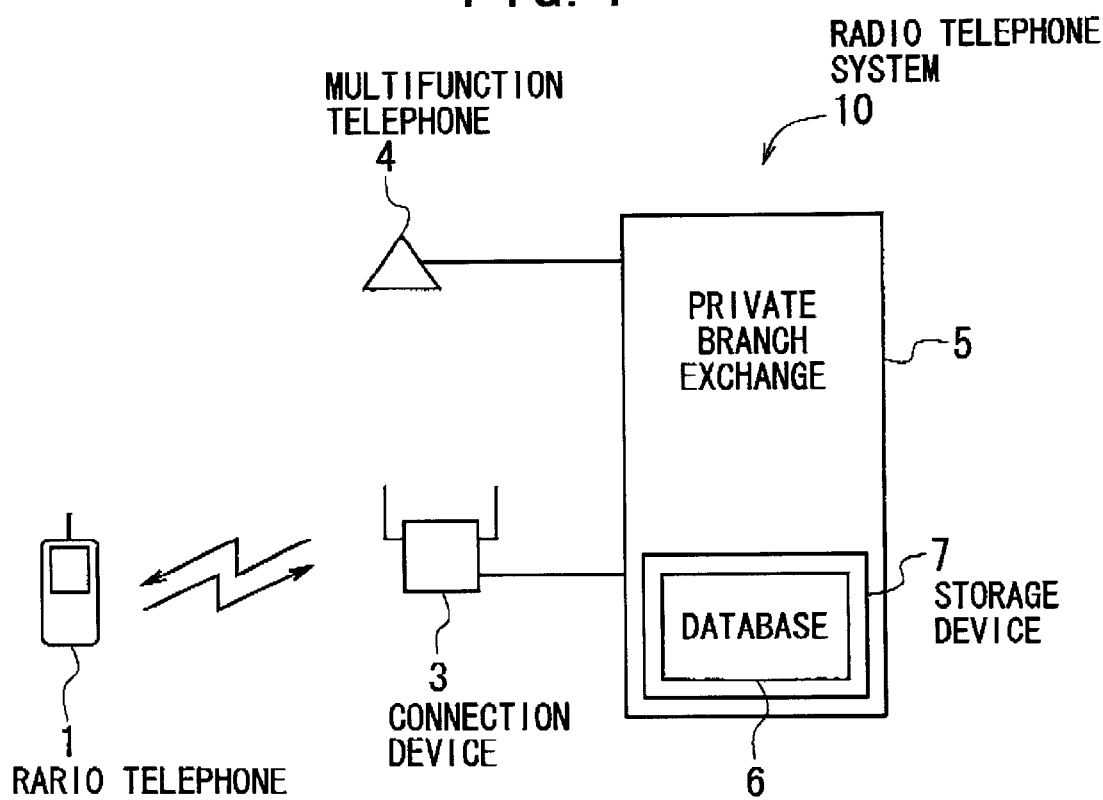
FIG. 1 is a schematic block diagram showing the configuration of a radio telephone system according to an embodiment of the invention.

Preferred embodiments of the present invention will be described in detail below while referring to the drawings attached.

A radio telephone system 10 according to an embodiment of the invention has a configuration as shown in FIG. 1. The system provides specific additional functions, such as a voice mail function and an absent call transfer function. The system 10 is designed for the members of an organization.

The radio telephone system 10 according to the embodiment in FIG. 1 comprises a radio telephone 1, a connection device 3 for the telephone 1, a multifunction telephone 4, and a private branch exchange (PBX) 5.

The telephone 1 is connectable to the connection device 3 by radio while the device 3 is connected to the PBX 5 by cable. Thus, the telephone 1 is connectable to the PBX 5 by way of the device 3. The device 3 serves as a parent phone while the telephone 1 serves as its child phone. The device 3 can be used for speech communication also.

Any other radio telephones (not shown) connectable to the PBX 5 are provided in the system 10. However, they are omitted here for simplification of description.

The multifunction telephone 4, which has an ordinary configuration, is connected to the PBX 5 by cable. The PBX 5 operates to make interconnection and/or disconnection between the telephones 1 and 4, the device 3, and the other radio telephones (not shown) by way of the internal and/or external telephone lines.

The radio telephone 1 has specific additional functions like those of the multifunction telephone 4 along with the speech communication as its main function. The additional functions of the telephone 1 include "voice mail", "absent call transfer", "inside line interconnection", "outside line interconnection", and "call waiting".

The "voice mail" function is as follows. If someone makes a call to the telephone number of the radio telephone 1, the voice mail subsystem (not shown) in the PBX 5 answers the call, receives the caller's voice message, and stores it in his or her voice mail box. Then, the voice mail subsystem tells the user of the telephone 1 the receipt of message by sending a piece of information to the telephone 1 through the connection device 3.

The "absent call transfer" function is as follows. If someone makes a call to the telephone number of the radio telephone 1, the absent call transfer subsystem (not shown) in the PBX 5 receives the call and then, transfers the call automatically to a previously-specified telephone with a specified telephone number. This function can be activated or inactivated as necessary.

The "inside line interconnection" function is a function to form interconnection between the telephones by way of internal telephone lines", allowing the radio telephone 1 to communicate with one of the internal telephones through the internal line, for example. This function is provided by the PBX 5.

The "outside line interconnection" function is a function to make transmission and/or reception of calling signals sent from the outside or inside. For example, if someone makes a call from the outside to the telephone number of the radio telephone 1, the PBX 5 receives the call and transfers it automatically to the telephone 1. If the user of the telephone 1 makes a call to a specific telephone number outside, the PBX 5 receives the call and transfers it automatically to the specific number by way of an external telephone line. This function is performed by the PBX 5.

The "call waiting" function is as follows. If someone makes a call to the telephone number of the radio telephone 1 while the user of the telephone 1 has a speech communication to another, the receipt of the someone's call is advised to the user by a call waiting subsystem (not shown) in the PBX 5. At this stage, if the user performs a specific operation, the call waiting subsystem switches the connection so that the user receives the someone's call.

Figure 2:
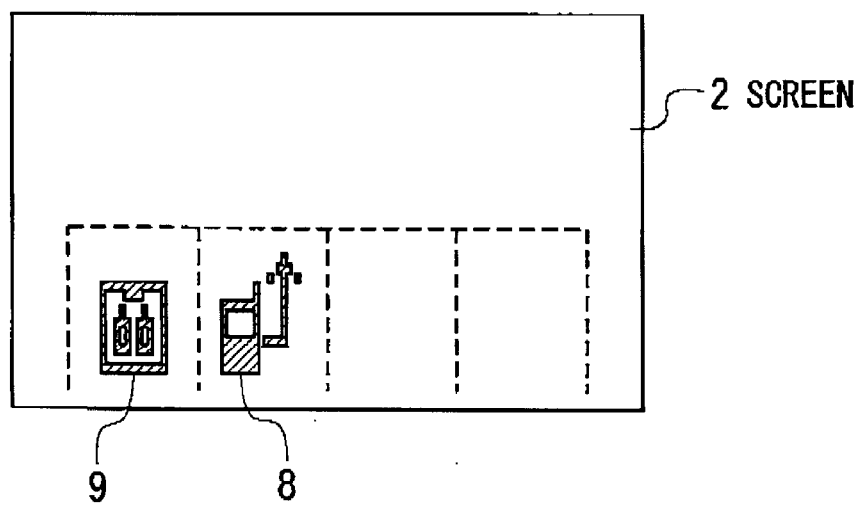
FIG. 2 is a schematic illustration showing the icons displayed on the screen of the radio telephone in the system according to the embodiment of the invention.

As shown in FIG. 2, the telephone 1 has a rectangular display screen 2 on its body. Specific information can be displayed on the screen 2 as necessary by a controller (not shown) in the telephone 1. The information is represented by characters and/or icons.

As shown in FIG. 1, the PBX 5 has a storage device 7 such as a hard disk into which a database 6 is installed. The database 6 stores the "subscriber data" containing the telephone number, the user ID, the voice mail box data, the voice mail message data, and the setting or status data of the individual additional functions for all the telephones connected to the PBX 5 including the telephones 1 and 4.

If some of the subscriber data in the database 6 for the radio telephone 1 is/are changed or renewed due to the operation of the telephone users or other persons outside, the PBX 5 sends a specific icon signal to the telephone 1 by way of the connection device 3. On receipt of this icon signal, the telephone 1 displays a specific icon on the screen 2 according to the content of the icon signal thus sent, telling the user of the telephone 1 the subscriber data thus changed or renewed.

Since the system 10 is designed for the members of the organization (e.g., a company), the user of the telephone 1 and the user of the multifunction telephone 4 are members of the organization that has set up the system 1.

As shown in FIG. 2, two icons 8 and 9 are displayed on the screen 2 of the radio telephone 1. The icon 8 indicates the present setting or status of the "absent call transfer" function of the telephone 1. The icon 9 indicates the present status of the "voice mail" function of the telephone 1, in other words, the icon 9 indicates the receipt of voice mail messages addressed to the user of the telephone 1. These two icons 8 and 9, which are arranged at their positions specified previously on the screen 2, have appropriate shapes to recall or image their meanings easily. Needless to say, other icons and characters are displayed on the screen 2. However, they are omitted here for the sake of simplification of description, because they have little relation to the invention.

Next, the operation of the radio telephone system 10 according to the embodiment of FIG. 1 is explained below.

Normally, the radio telephone 1 is kept in its standby state and therefore, it can receive any signal any time in this state. On the other hand, for example, if a voice mail message is posted or deposited into the mail box of the user of the telephone 1 provided in the PBX 5, the content of the subscriber data stored in the database 6 for the telephone 1 is changed. On the other hand, if the user of the telephone 1 changes the setting of one or more of the additional functions of the telephone 1 such as the "absent call transfer" function, the content of the subscriber data in the database 6 is changed as well. Thus, it is necessary to tell the user of the telephone 1 the change of the subscriber data as soon as possible. Unless the change is told to the user, some problem may happen to the user.

Figure 3:
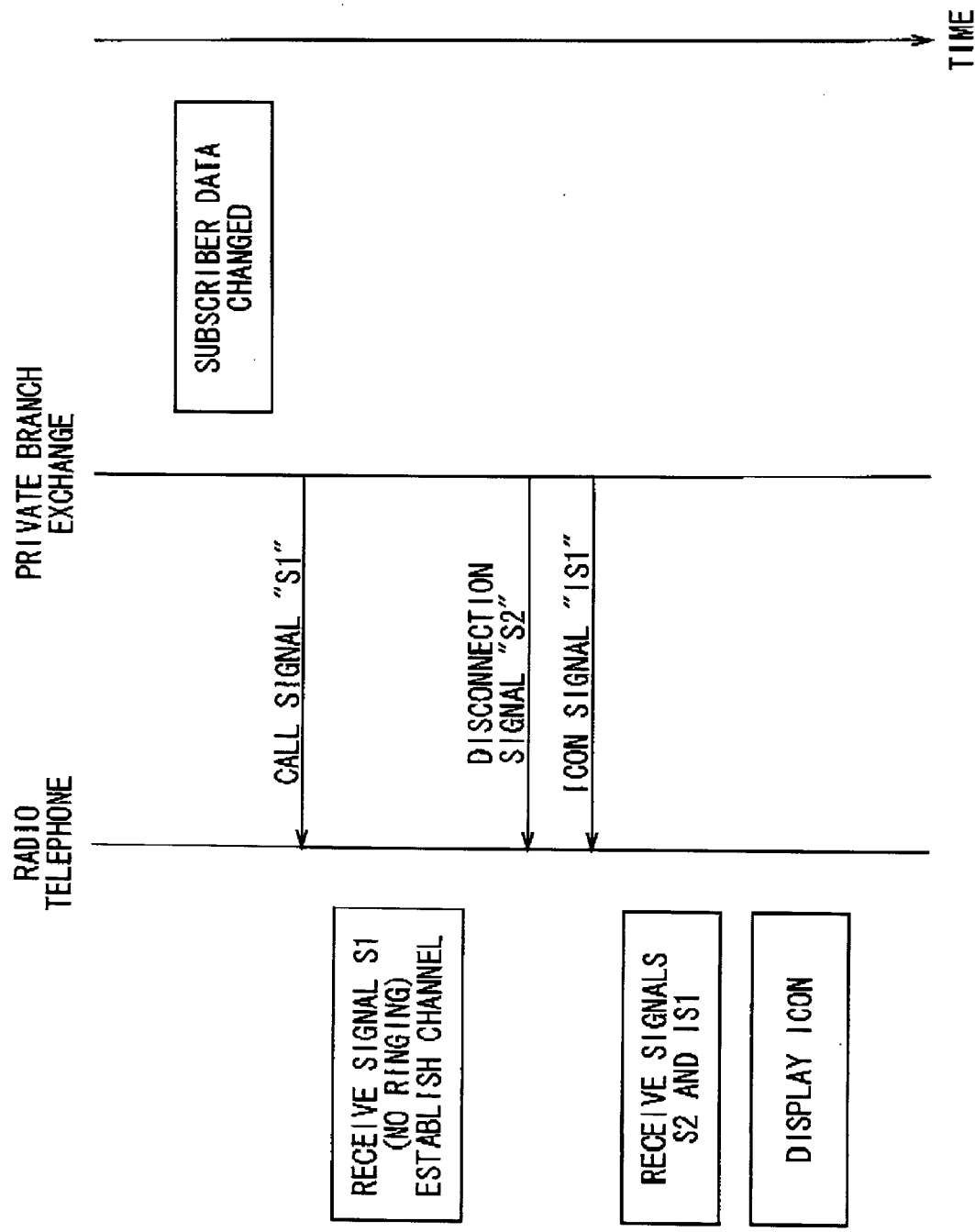
FIG. 3 is a schematic illustration showing the operation of the system according to the embodiment of the invention, in which the radio telephone is in the standby state.

To cope with this need, as shown in FIG. 3, the PBX 5 sends immediately a call signal S1 to the telephone 1 if the content of the subscriber data stored in the database 6 is changed due to some reason as stated above. The signal S1 is so designed that the radio telephone 1 performs its receiving operation without any ringing or alarming operation. Therefore, the telephone 1 receives the call signal S1 without informing the telephone's user about the receipt of the signal S1. Also, because the telephone 1 performs its receiving operation without ringing, the user of the telephone 1 is able to distinguish the receipt of the special call signal S1 from that of ordinary call signals for speech communication.

When the telephone 1 responds to the call signal S1, a communication channel is automatically established between the telephone 1 and the PBX 5. After the communication channel is established, the PBX 5 sends an icon signal IS1 and a disconnection signal S2 to the telephone 1 by way of the communication channel thus established. The icon signal IS1 includes the instruction to display (or not to display) the specific icon on the screen 2 of the telephone 1 according to the changed or renewed content of the subscriber data stored in the data base 6. The telephone 1 receives the signals S2 and IS1. The telephone 1 reads the instruction in the signal IS1 thus received and then, displays or eliminates the icon or icons 8 and/or 9 on the screen 2 according to the changed or renewed subscriber data. On the other hand, the telephone 1 disconnects the channel according to the signal S2.

As explained above, when the radio telephone 1 is in its standby state, the change or renewal of the subscriber data in the database 6 for the telephone 1 can be promptly reflected on the screen 2 through the call signal S1 and the icon signal IS1 sent from the PBX 5. This means that the content of the data in the database 6 accords with the meaning of the icon 8 or 9 almost simultaneously.

However, when the radio telephone 1 is outside the communicable area, the telephone 1 is unable to receive the call signal S1 form the PBX 5 and therefore, the above-described operation is not applicable. Also, the user often turns off the telephone 1 in some situations, such as the user being attending a meeting or riding on a train. This is because the user does not wish the ringing sound emitted by receipt of ordinary call signals at the telephone 1 interrupts the prosecution of the meeting or gives passengers unpleasant feeling. The telephone 1 is unable to receive the call signal S1 in this state as well.

As a result, there is a possibility that the content of the subscriber data stored in the database 6 does not accord with the meaning of the icons 8 and 9 on the screen 2. To avoid this disadvantage, when the telephone 1 is unable to receive the call signal S1, the changing or renewing operation of the icon or icons 8 and/or 9 on the screen 2 is carried out during a subsequent speech communication of the telephone 1.

Figure 4:
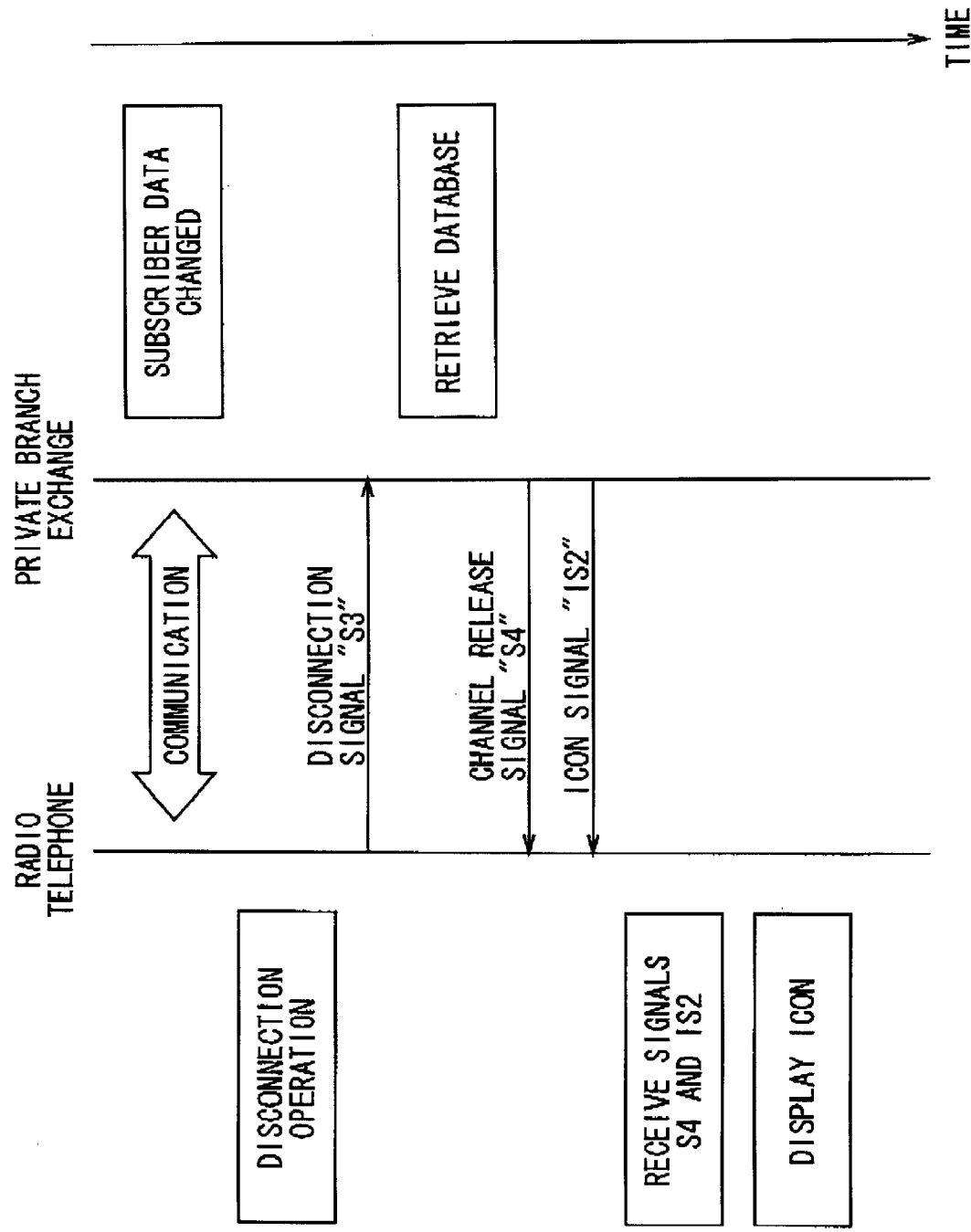
FIG. 4 is a schematic illustration showing the operation of the system according to the embodiment of the invention, in which the speech communication is stopped by the user of the radio telephone and the icon signal is sent to from the PBX at each speech communication.

Specifically, when a speech communication comes to an end, the user of the radio telephone 1 usually makes a specific disconnection operation on the telephone 1. In response to this disconnection operation, as shown in FIG. 4, the telephone 1 automatically sends a disconnection signal S3 to the PBX 5 by way of the connection device 3. At the time the PBX 5 receives the signal S3, the PBX 5 retrieves the database 6 in the storage device 7 to thereby form a retrieval result and then, the PBX 5 sends a channel release signal S4 and an icon signal IS2 to the telephone 1. The channel release signal S4 is to tell the telephone 1 that the communication channel will be released for subscriber data coincidence between the telephone 1 and the database 6. The icon signal IS2 is to display the icon 8 or 9 on the screen 2 according to the retrieval result thus obtained, thereby advising the present content of the subscriber data in the database 6 to the user.

As explained above, when the radio telephone 1 is unable to receive the call signal S1, the change or renewal of the subscriber data in the database 6 for the telephone 1 is reflected by the icons 8 and 9 on the screen 2 at each subsequent speech communication, as shown in FIG. 4.

Moreover, FIG. 4 shows the operation in the case where the user of the telephone 1 makes the disconnection operation on the telephone 1 to finish his or her speech communication. However, the speech communication may be finished by the person the user has spoken to (not the user himself or herself). In this case, the disconnection signal S3 is not sent to the PBX 5 from the telephone 1. Instead, a disconnection signal is sent to the PBX 5 from the telephone of the person the user has spoken to.

Figure 5:
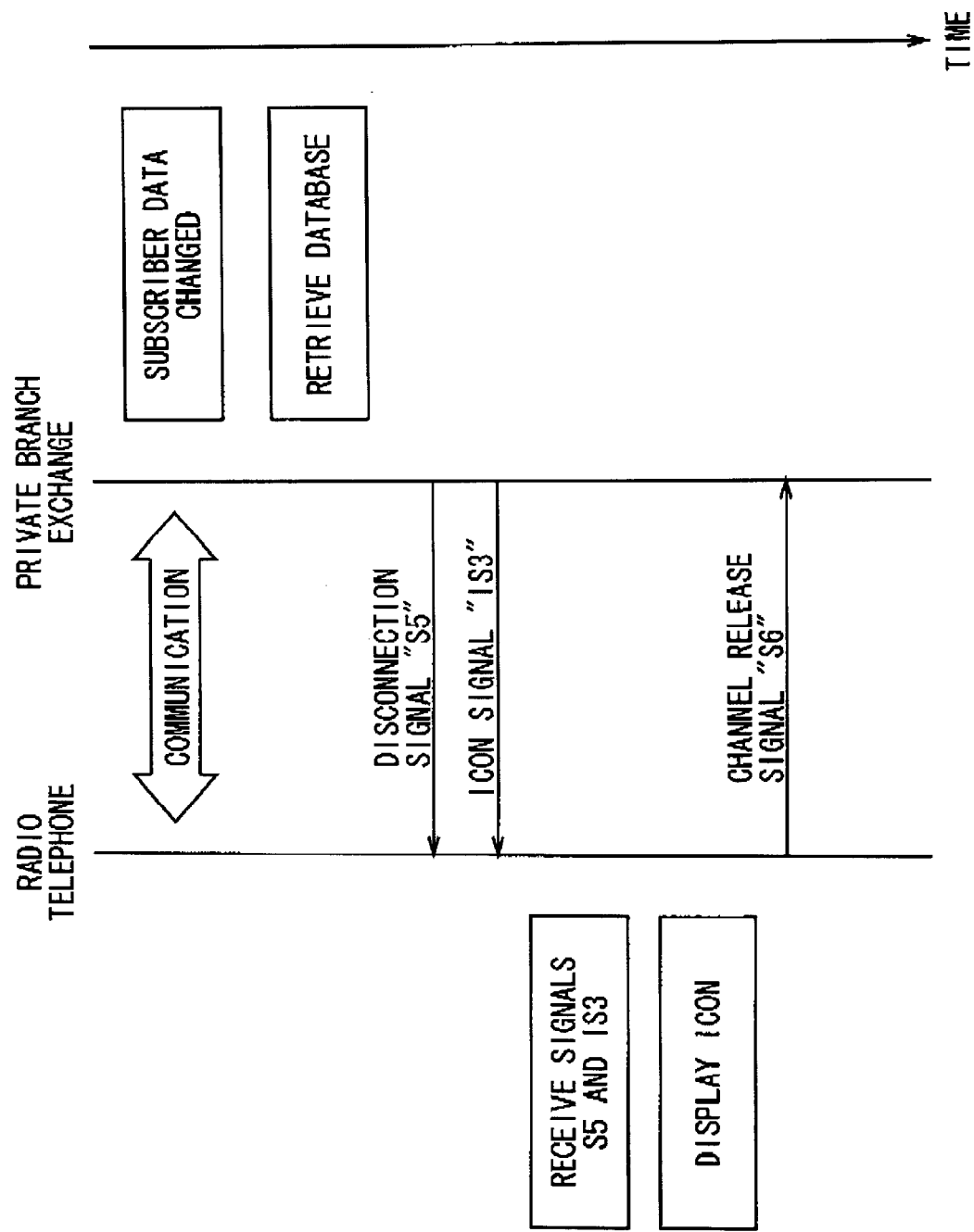

Thus, when the speech communication is not finished by the user of the telephone 1 himself or herself, the PBX 5 sends a disconnection signal S5 to the telephone 1, as shown in FIG. 5. The sending of the signal S5 is triggered by the disconnection signal sent from the person the user has spoken to. This operation is to ensure an available communication channel between the telephone 1 and the PBX 5.

Specifically, as shown in FIG. 5, when the speech communication is finished by the person the user has spoken and the PBX 5 receives the disconnection signal from the telephone of this person, the PBX 5 retrieves the subscriber data in the database 6, thereby forming a retrieval result. Then, the PBX 5 sends a disconnection signal S5 and an icon signal IS3 to the telephone 1. The icon signal IS3 contains the instruction to display (or not to display) the specific icons according to the retrieval result thus formed.

The telephone 1 receives the disconnection signal S5 to disconnect the communication channel between the telephone 1 and the PBX 5. Also, the telephone 1 receives the icon signal IS3 to display or not to display the icons 8 and/or 9 on its screen 2 according to the instruction of the signal IS3. Thus, the meaning of the icons 8 and 9 on the screen 2 accords with the present content of the subscriber data stored in the database 6.

After the communication channel between the telephone 1 and the PBX 5 is disconnected, the telephone 1 sends a channel release signal S6 to the PBX 5, thereby informing the PBX 5 of the channel being released.

Figure 6:
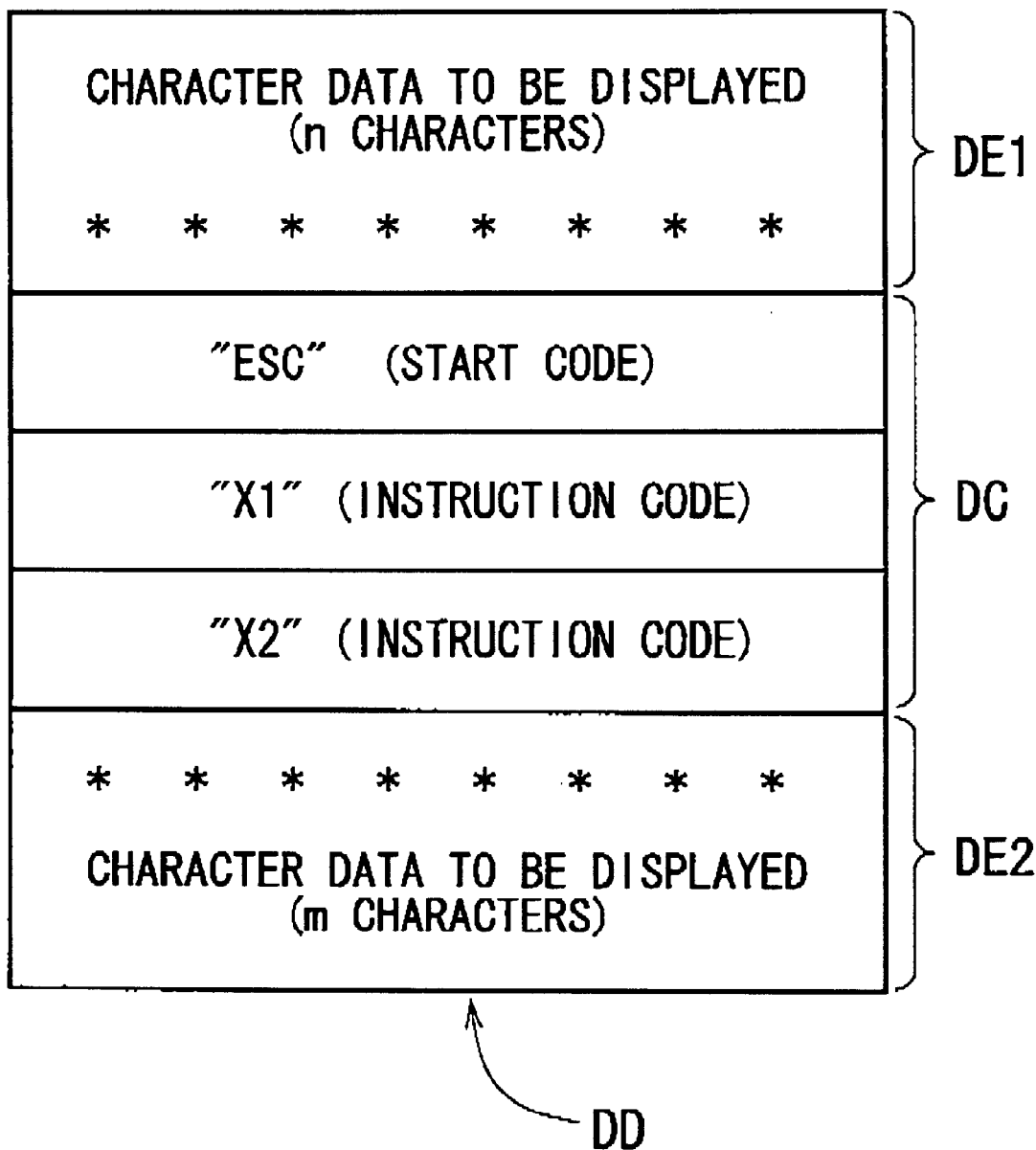
FIG. 6 is a schematic illustration showing an example of the coding scheme for the icon signal used in the system according to the embodiment of the invention, in which the icon signal formed by the combination of a start code and two instruction codes is inserted into the display data.

FIG. 6 schematically shows an example of the coding scheme for the icon signals IS1, IS2, and IS3.

As shown in FIG. 6, the display data DD includes data elements DE1 and DE2 and a set of display codes DC. The display code set DC is located between the elements DE1 and DE2. The data element DE1 contains specific character data to be displayed on the screen 2 of the radio telephone 1, in which the character data has n characters (n≧2). Similarly, the data element DE2 contains specific Character data to be displayed on the screen 2, in which the character data has m characters (m≧2).

The display code set DC contains a start code ESC and two instruction codes X1 and X2. The start code ESC represents the start of the set DC, informing the telephone 1 of the same. Also, the code ESC instructs the telephone 1 to treat two subsequent characters X1 and X2 to the code ESC as instruction codes, not characters. Thus, due to existence of the code ESC, the telephone 1 distinguishes easily characters serving as the instruction codes X1 and X2 from ordinary characters serving as the characters to be displayed.

The instruction code X1 represents the type or sort of icons to be displayed on the screen 2. For example, the code X1 may be set as "V" (i.e., X1=V), in which the code "v" means that a voice mail message or messages has/have been posted into a specific voice mail box. The code X1 may be set as "F" (i.e., X1=F), in which the code "F" means that the "absent call transfer" function has been activated.

The instruction code X2 represents whether or not the specified icons whose type has been defined by the code X1 is displayed on the screen 2. For example, the code X2 may be set as "1" (i.e., X2=1), in which the code "1" means that the specified icon is displayed on the screen 2. The code X2 may be set as "0" (i.e., X2=0), in which the code "1" means that the specified icon is not displayed on the screen 2.

The display data set DC may be inserted at any location within all the characters of the display data DD. Also, the display code set DC may be inserted two or more times. If two or more instruction codes X1 having different meanings are inserted into the display data DD, or the telephone 1 receives the code X1 twice or more, the telephone 1 understands these codes X1 in such a way that the highest priority is assigned to the last one of the codes X1. Similarly, if two or more instruction codes X2 having different meanings are inserted into the data DD, or the telephone 1 receives the code X2 twice or more, the telephone 1 understands these codes X2 in such a way that the highest priority is assigned to the last one of the codes X2.

Figure 7:
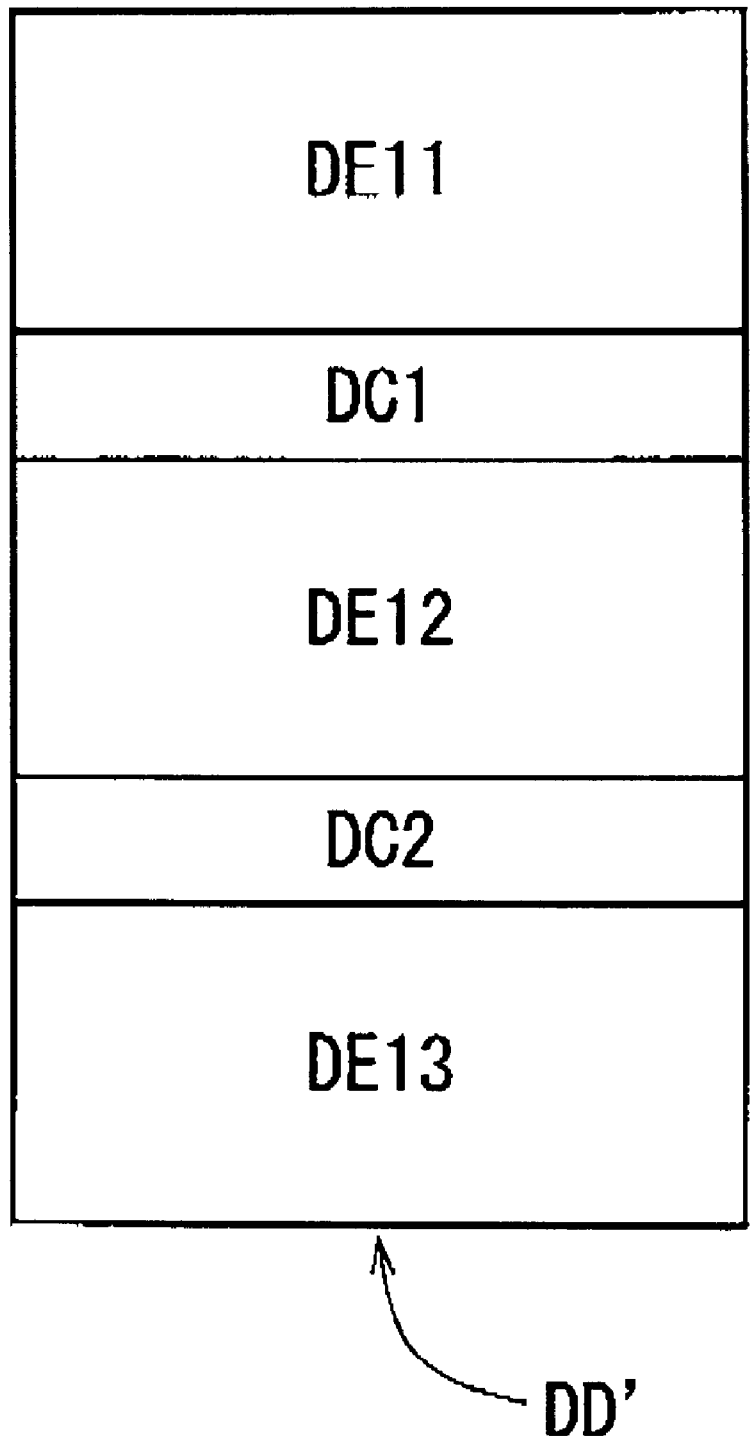
FIG. 7 is a schematic illustration showing another example of the coding scheme for the icon signal used in the system according to the embodiment of the invention, in which the icon signal formed by the combinations of start codes and instruction codes are inserted into the display data at different locations.

FIG. 7 shows an example of the coding scheme for this case, where two data code sets DC1 and DC2 are inserted at different locations in the display data DD' The reference symbols DE1, DE12, and DE13 denote data elements of the data DD'.

There is a possibility that the display code set DC (i.e., the combination of the codes ESC and X1 and X2) is inserted in a group of characters of the display data DD, where the group of characters should be displayed together in the same area of the screen 2. In this case, the group of characters is divided into two parts, i.e., the front and rear ones. The telephone 1 understands these codes ESC, X1 and X2 in such a way that the front part of the group of characters should be combined with its rear part.

In the radio telephone system 10 according to the embodiment of FIG. 1, as explained above, the display data DD are designed to be transmitted to the radio telephone 1 along with the disconnection signal S2 or S5 or the channel release signal 54 sent from the PBX 5, thereby displaying the specific characters in the data DD on the screen 2 of the telephone 1. Also, the display code set DC for the icon signal IS1, IS2, or IS3 is inserted to the data DD. As a result, there is an advantage that no additional signal transmission and reception is necessary to send the display code set DC for the icon signal IS1, IS2, or IS3 to the telephone 1.

With the radio telephone system 10 according to the embodiment of the invention, as described above, the user of the radio telephone 1 is unnecessary to access the PBX 5 (i.e., the center or control section of the system 10) in order to confirm the setting or status of the installed additional functions. This means that the convenience and operability of the installed additional functions is improved.

Also, since the status of the installed additional functions in the PBX 5 always accords with the data displayed on the screen 2 of the telephone 1, the problem or problems caused by the disaccord between the status in the PBX 5 and the data displayed on the screen 2 can be solved. Thus, equivalent services to multifunction telephones can be provided.

For example, the absent call transfer icon 8 is always displayed on the screen 2 and therefore, the user of the telephone 1 can ascertain the present setting or status of the "absent call transfer" function in the radio telephone system 10 at any time. Thus, unwanted call transfer can be avoided. In other words, if the user of the telephone 1 forgets the fact that he or she has activated the "absent call transfer" function, a trouble tends to occur that a call to the user is mistakenly transferred to the specified telephone number, though the user can answer the call. However, with the system 10, this trouble can be prevented if the user simply looks at the icon 9 on the screen 2 to know the present setting of the function in question.

Moreover, since the voice mail icon 9 is always displayed on the screen 2 as necessary, the user of the telephone 1 can know whether or not a voice mail message or messages has/have been posted in the voice mail box for the user in the system 10 at any time. Thus, an unwanted state that no answer is forwarded to the voice mail message in the mail box for the telephone 1 for a long time can be avoided. In other words, because the user of the telephone 1 is unable to know the receipt of voice mail messages until the PBX 5 notifies the user of the receipt of voice mail messages, a trouble tends to occur that an important voice mail message is mistakenly left unanswered for a long time, though the user can answer the message promptly. However, with the system 10, this trouble can be prevented if the user simply looks at the icon 9 on the screen 2 to know the state of his or her voice mail box.

As a result, obtainable convenience of the additional functions of the radio telephone 1 and the system 10 is enhanced. This means that these additional functions can provide excellent operability or services corresponding to the multifunction telephone 4.

It is needless to say that the invention is not limited to the above-described embodiment and any change is applicable thereto.

For example, in the above-described system 10 according to the embodiment, the explanation is presented for the absent call transfer and voice mail functions only. However, it may be applied to any other function, such as the electronic mail (E-mail) function Also, although the display code set DC includes the start code ESC and the instruction codes X1 and X2 in the system 10, the invention is not limited to this case. The display code set DC may be three or more instruction codes according to the necessity along with at least one start code.

Furthermore, the above-described system 10 is designed for the specific organization using the PBX 5 and internal telephone lines. However, the invention may be applied to any radio telephone system using public networks.

While the preferred form of the present invention has been described, it is to be understood that modifications will be apparent to those skilled in the art without departing from the spirit of the invention. The scope of the present invention, therefore, is to be determined solely by the following claims.

What is claimed is:

1. A radio telephone system having additional functions, comprising:
   (a) an exchange device for connecting/disconnecting telephone lines;
   (b) a storage device for storing a subscriber database;
      the subscriber database containing subscriber data of the system and status data about status of the additional functions;
   (c) a radio telephone connectable to the exchange device by radio; and
   (d) the telephone having a screen for displaying specific icons corresponding to the status data;
      wherein when a piece of the status data in the subscriber data has been changed, an icon signal corresponding to the piece of status data thus changed is sent to the telephone;
      wherein the telephone receives the icon signal thus sent and displays a specific icon corresponding to the icon signal on the screen, and
      wherein the icon signal is sent to the radio telephone along with a disconnection signal or a channel release signal sent from the exchange device.

2. The system according to claim 1, wherein the icon signal is inserted into a character data set that is sent to the radio telephone;
   the character data set containing specific characters to be displayed on the screen of the radio telephone.

3. The system according to claim 1, wherein the icon signal contains a start code and instruction codes subsequent to the start code;
   and wherein the telephone recognizes start of the instruction codes by the start code;
   and wherein the telephone operates according to the instruction codes to thereby display the icon on the screen of the telephone.

4. The system according to claim 1, wherein the icon displayed on the screen of the telephone has a shape causing a user of the telephone to have an image about the piece of status data thus changed.

5. A radio telephone system having additional functions, comprising:
   (a) an exchange device for connecting/disconnecting telephone lines;
   (b) a storage device for storing a subscriber database;
      the subscriber database containing subscriber data of the system and status data about status of the additional functions;
   (c) a radio telephone connectable to the exchange device by radio; and
   (d) the telephone having a screen for displaying specific icons corresponding to the status data,
      wherein when a piece of the status data in the subscriber data has been changed, an icon signal corresponding to the piece of status data thus changed is sent to the telephone,
      wherein the telephone receives the icon signal thus sent and displays a specific icon corresponding to the icon signal on the screen,
      wherein the icon signal contains a start code and instruction codes subsequent to the start code,
      wherein the telephone recognizes start of the instruction codes by the start code,
      wherein the telephone operates according to the instruction codes to thereby display the icon on the screen of the telephone, and
      wherein a first one of the instruction codes is used for designating an icon type while a second one of the instruction codes is used for designating whether or not the icon thus designated is displayed on the screen of the telephone.

6. A method of displaying subscriber data on a screen of a radio telephone in a radio telephone system having additional functions;

the method comprising the steps of:
(a) providing an exchange device for connecting/disconnecting telephone lines;
(b) providing a storage device for storing a subscriber database;
the subscriber database containing subscriber data of the system and status data about status of the additional functions;
(c) providing a radio telephone connectable to the exchange device by radio;
the telephone having a screen for displaying specific icons corresponding to the status data;
(d) sending the telephone an icon signal corresponding to a piece of the status data that has been changed in the database;
(e) receiving the icon signal thus sent by the telephone;
(f) displaying a specific icon corresponding to the icon signal thus received on the screen of the telephone,
wherein the icon signal is sent to the radio telephone along with a disconnection signal or a channel release signal sent from the exchange device.

7. The method according to claim 6, further comprising
(g) a step of sending a call signal to the radio telephone;
the step (g) being performed prior to the step (d) of sending the telephone the icon signal; and
(h) a step of sending a disconnection signal to the telephone;
the step (h) being performed after the step (g) if the telephone receives the call signal.

8. The method according to claim 6, further comprising
(i) a step of sending a disconnection signal from the radio telephone to the exchange device;
the step (i) being performed prior to the step (d) of sending the telephone the icon signal; and
(j) a step of retrieving the database to find existence or absence of change of the status data relating to the telephone;
(k) sending a disconnection signal to the telephone according to a retrieval result in the step (j).

9. The method according to claim 6, further comprising
(l) a step of retrieving the database to find existence or absence of change of the status data relating to the telephone;
the step (l) being performed prior to the step (d) of sending the telephone the icon signal; and
(m) a step of sending a disconnection signal to the radio telephone according to a retrieval result in the step (l).

10. The method according to claim 6, wherein the icon signal is inserted into a character data set that is sent to the radio telephone;
and wherein the character data set contains specific characters to be displayed on the screen of the radio telephone.

11. The method according to claim 10, wherein the icon signal contains a start code and instruction codes subsequent to the start code;
and wherein the telephone recognizes start of the instruction codes by the start code while the telephone operates according to the instruction codes to thereby display the icon on the screen of the telephone.

12. The method according to claim 11, wherein a first one of the instruction codes is used for designating an icon type while a second one of the instruction codes is used for designating whether or not the icon thus designated is displayed on the screen of the telephone.

13. The method according to claim 6, wherein the icon signal contains code sets inserted into a character data set that is sent to the radio telephone, the code sets being located at different position in the character data set;
and wherein the character data set contains specific characters to be displayed on the screen of the radio telephone.

14. The method according to claim 13, wherein each of the code sets contains a start code and instruction codes subsequent to the start code;
and wherein the telephone recognizes start of the instruction codes by the start code in each of the code sets while the telephone operates according to the instruction codes in the same code set to thereby display the icon on the screen of the telephone.

15. The method according to claim 14, wherein a first one of the instruction codes in each of the code sets is used for designating an icon type while a second one of the instruction codes in the same code set is used for designating whether or not the icon thus designated is displayed on the screen of the telephone.

16. A method of displaying subscriber data on a screen of a radio telephone in a radio telephone system having additional functions;

the method comprising the steps of:
(a) providing an exchange device for connecting/disconnecting telephone lines;
(b) providing a storage device for storing a subscriber database;
the subscriber database containing subscriber data of the system and status data about status of the additional functions;
(c) providing a radio telephone connectable to the exchange device by radio;
the telephone having a screen for displaying specific icons corresponding to the status data;
(d) sending the telephone an icon signal corresponding to a piece of the status data that has been changed in the database;
(e) receiving the icon signal thus sent by the telephone; and
(f) displaying a specific icon corresponding to the icon signal thus received on the screen of the telephone,
wherein the icon signal contains code sets inserted into a character data set that is sent to the radio telephone, the code sets being located at different position in the character data set,
wherein the character data set contains specific characters to be displayed on the screen of the radio telephone,
wherein a highest priority is assigned to a last one of the code sets in the step (f) of displaying the specific icon on the screen of the telephone.

17. The method according to claim 16, wherein one of the instruction codes in a last one of the code sets is used for designating an icon type.

18. The method according to claim 16, wherein one of the instruction codes in a last one of the code sets is used for designating whether or not the icon thus designated is displayed on the screen of the telephone.

* * * * *